United States Patent
Lubbers

(10) Patent No.: US 8,152,245 B2
(45) Date of Patent: Apr. 10, 2012

(54) VEHICLE SYSTEM HAVING REGENERATIVE BRAKE CONTROL

(75) Inventor: Mark D. Lubbers, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 821 days.

(21) Appl. No.: 11/662,482

(22) PCT Filed: Sep. 9, 2005

(86) PCT No.: PCT/US2005/032231
§ 371 (c)(1),
(2), (4) Date: Oct. 4, 2007

(87) PCT Pub. No.: WO2006/029353
PCT Pub. Date: Mar. 16, 2006

(65) Prior Publication Data
US 2008/0100129 A1      May 1, 2008

Related U.S. Application Data

(60) Provisional application No. 60/608,468, filed on Sep. 9, 2004, provisional application No. 60/686,802, filed on Jun. 1, 2005.

(51) Int. Cl.
*B60T 8/64* (2006.01)
(52) U.S. Cl. ........................................ 303/151; 303/152
(58) Field of Classification Search .................. 303/151, 303/152; 180/65.1, 65.21, 65.31; 701/22
See application file for complete search history.

(56) References Cited

U.S. PATENT DOCUMENTS

| | | | |
|---|---|---|---|
| 4,591,016 A | 5/1986 | Matthews | |
| 5,378,053 A | 1/1995 | Patient | |
| 5,399,000 A * | 3/1995 | Aoki et al. | 303/3 |
| 5,511,859 A * | 4/1996 | Kade et al. | 303/152 |
| 5,615,933 A | 4/1997 | Kidston | |
| 6,278,916 B1 | 8/2001 | Crombez | |
| 6,325,470 B1 | 12/2001 | Schneider | |
| 6,439,674 B1 | 8/2002 | Niino | |
| 6,454,364 B1 * | 9/2002 | Niwa et al. | 303/152 |
| 6,508,523 B2 | 1/2003 | Yoshino | |
| 6,634,722 B1 | 10/2003 | Zheng | |
| 6,691,013 B1 | 2/2004 | Brown | |
| 6,724,165 B2 | 4/2004 | Hughes | |
| 7,059,691 B2 * | 6/2006 | Tsunehara et al. | 303/152 |
| 7,077,484 B2 * | 7/2006 | Sasaki et al. | 303/152 |
| 2003/0169002 A1 | 9/2003 | Hughes | |
| 2003/0230933 A1 | 12/2003 | Schneider | |
| 2003/0234577 A1 | 12/2003 | Crumbez | |

(Continued)

*Primary Examiner* — Thomas J Williams
(74) *Attorney, Agent, or Firm* — MacMillan Sobanski & Todd, LLC

(57) ABSTRACT

A method is provided for controlling the braking of a vehicle that has a first set of friction brakes for applying a first apply brake force to a first set of wheels and a second set of friction brakes for applying a second brake apply force to a second set of wheels. A powertrain assembly is coupled to the second set of wheels. The powertrain assembly includes a regenerative braking unit capable of recapturing kinetic energy from the second set of wheels. The vehicle is braked in a first phase of control using regenerative braking to brake the second set of wheels to achieve up to a first value of braking. The vehicle is braked in a second phase of control using the regenerative braking to maintain braking of the second set of wheels at the first value of braking force while selectively applying the first friction brakes to the first set of wheels up to a second value of braking.

24 Claims, 8 Drawing Sheets

U.S. PATENT DOCUMENTS

| | | |
|---|---|---|
| 2004/0046448 A1 | 3/2004 | Brown |
| 2005/0029863 A1 | 2/2005 | Brown |
| 2005/0143878 A1* | 6/2005 | Park et al. .................... 180/65.3 |
| 2007/0018499 A1* | 1/2007 | Kokubo et al. ............... 303/151 |

* cited by examiner

VEHICLE SYSTEM HAVING REGENERATIVE BRAKE CONTROL

CROSS REFERENCE TO RELATED APPLICATIONS

This application is the U.S. national phase of International Application No. PCT/US2005/032231, filed Sep. 9, 2005, which claims priority to U.S. Provisional Application Ser. No. 60/608,468 filed Sep. 9, 2004, and U.S. Provisional Patent Application Ser. No. 60/686,802 filed Jun. 1, 2005. The disclosures of both applications are incorporated herein by reference.

STATEMENT REGARDING FEDERALLY SPONSORED RESEARCH

Not Applicable.

BACKGROUND OF THE INVENTION

1. Field of the Invention

This invention relates in general to vehicle braking systems, and in particular to a method of controlling a braking system having regenerative brake control.

2. Background of the Invention

Vehicular regenerative braking systems generally capture forward kinetic energy from braking events and use that recovered energy to accelerate the vehicle. By using energy recovered from braking, the energy efficiency of the vehicle is improved. Regenerative braking may be used on vehicles having hybrid or pure electric powertrain platforms. On many of these hybrid or pure electric powertrain vehicle platforms, maximum recovery of braking energy is required to make the vehicle viable in the market place. Ideally, these regenerative braking systems are generally transparent (unnoticed) to the driver.

Vehicles are commonly slowed and stopped with hydraulic brake systems employing friction wheel brakes. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems in conventionally fueled vehicles typically use a brake booster that acts during braking to provide additional force that assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting and increases the pressure of the fluid acting on the wheel brakes. Thus, the pressures generated by the master cylinder are increased. Hydraulic boosters are commonly located adjacent the master cylinder piston and use a boost valve to control the pressurized fluid applied to the booster. Typically the boost valve is connected with the booster in the master cylinder assembly and mechanically coupled to the brake pedal for proper operation.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Wheel lock-up leads to loss of directional control and possible greater stopping distances.

Advances in braking technology have led to the adoption of Anti-lock Braking Systems (ABS). In ABS, the system monitors wheel rotational behavior and selectively applies and relieves brake pressure in the corresponding wheel brakes in order to maintain the wheel speed within a selected slip range to achieve good braking force and maintain steering control by avoiding wheel lock-up. While such systems are typically adapted to control the braking of each braked wheel of the vehicle, some systems have been developed for controlling the braking of only a portion of the plurality of braked wheels.

Electronically controlled ABS valves, including apply valves and dump valves, are located between the master cylinder and the wheel brakes. The ABS valves regulate the pressure between the master cylinder and the wheel brakes during ABS braking. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are generally required at the front and rear axles to reach the desired slip levels. Therefore, the brake pressures should be proportioned between the front and rear brakes to achieve the highest braking forces at each axle. In conventional braking systems of the past, this apportioning was accomplished by a proportioning valve, which typically proportioned front and rear brake pressure according to a fixed ratio. Braking systems may be provided with Dynamic Rear Proportioning (DRP) systems, which use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive torque applied to wheels during vehicle acceleration leads to wheel slippage and a loss of traction. An electronic control system senses this wheel slippage and automatically applies braking pressure to the wheel cylinders of the slipping wheel to reduce the slippage and increase the traction available. In order to achieve optimal vehicle acceleration, pressurized brake fluid (e.g., from the ABS pump) is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices (e.g., pump, boost valves, apply valves, and dump valves) to regulate the amount of hydraulic pressure applied to specific individual wheel brakes.

In electric vehicles, in order to extend vehicle range, it is typical to include some kind of regenerative braking system in the vehicle. A regenerative braking system seeks to recapture energy from a moving vehicle by converting kinetic energy to electrical energy and storing it in an energy storage device such as a battery. The vehicle is also slowed as a result of the process of recapturing energy. Most regenerative braking systems work by using an electromagnetic drive motor(s) as generators. The operation of one such system is coupled to a selector switch and the accelerator pedal. When the selector switch is set for regenerative operation, as the driver removes his foot from the accelerator pedal, the electric motor is de-energized and coupled to the battery charging circuit which places an electromagnetic load within the motor. This simultaneously acts to slow the vehicle as well as generate electricity that is returned to the batteries.

Regenerative braking systems are cooperatively controlled with the friction brakes to allow for maximum energy recovery during braking operations. As the driver applies the brake, brake torque is generated with frictional braking on the respective wheels and/or regenerative braking torque on a respective Driven axle. In order to maximize recovered energy, preference is given to the regenerative system. The regenerative braking system blends to the torque generated from the regenerative drivetrain with friction braking by controlling pressure in the foundation brake system to achieve a smooth deceleration.

SUMMARY OF THE INVENTION

Figure 1:
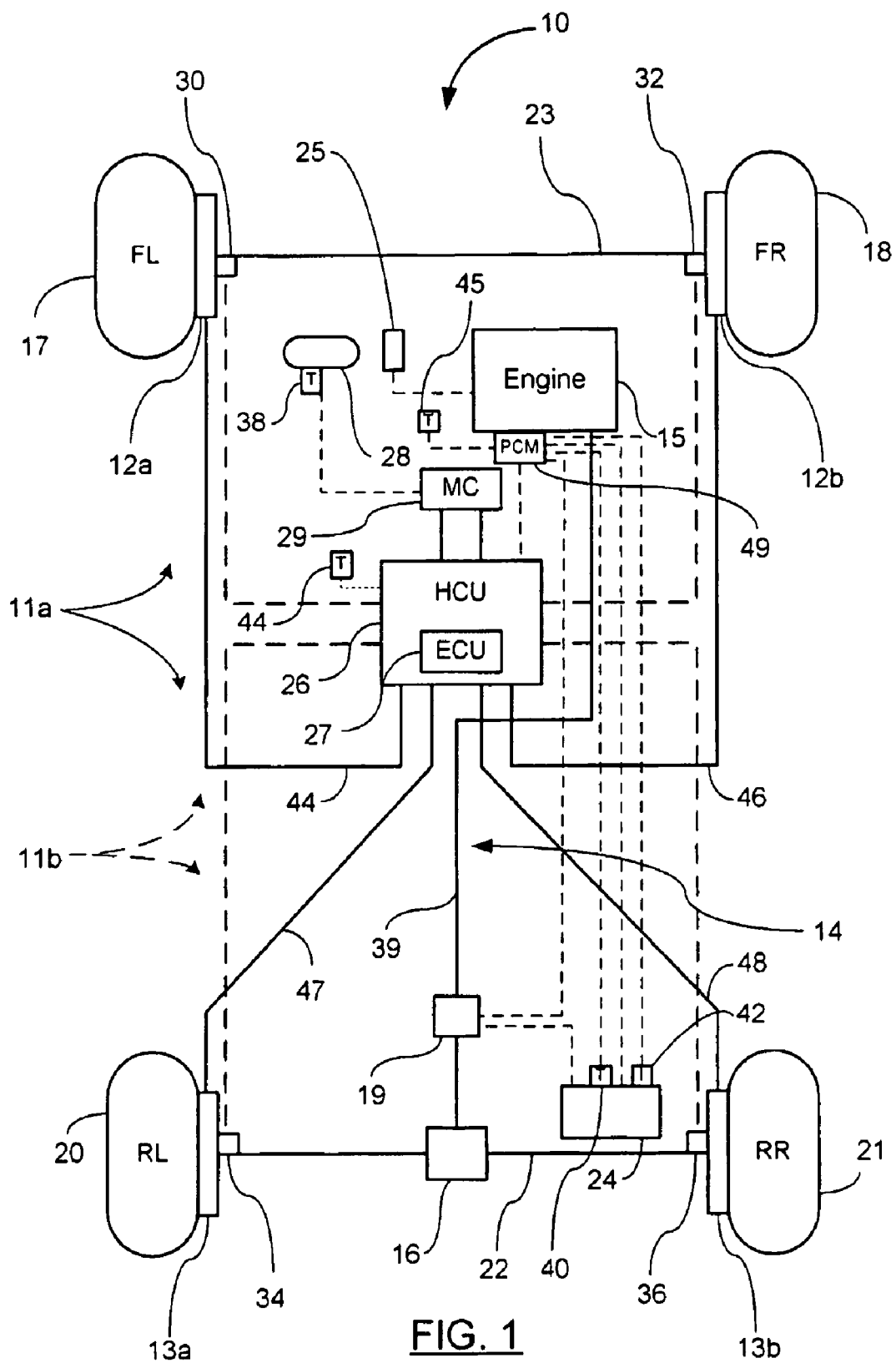
FIG. 1 is a schematic representation of a vehicular regenerative brake system having an electric powertrain assembly and a friction brake system controlled in accordance with a preferred embodiment of the present invention.

In one aspect of the present invention, a method is provided for controlling the braking of a vehicle that has a first set of friction brakes for applying a first apply brake force to a first set of wheels and a second set of friction brakes for applying a second brake apply force to a second set of wheels. A powertrain assembly is coupled to the second set of wheels. The powertrain assembly includes a regenerative braking unit capable of recapturing kinetic energy from the second set of wheels. The vehicle is braked in a first phase of control using regenerative braking to brake the second set of wheels to achieve up to a first value of braking. The vehicle is braked in a second phase of control using the regenerative braking to maintain braking of the second set of wheels at the first value of braking force while selectively applying the first friction brakes to the first set of wheels up to a second value of braking.

DETAILED DESCRIPTION OF THE INVENTION

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "right-hand", "left-hand", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar meaning.

Throughout this specification and claims, the term "in fluid communication with" refers to a hydraulic connection between two or more components in which hydraulic pressure is transmittable from one component to another through a fluid medium. The fluid medium may or may not contain a valve regulating the flow of fluid between the components. The components can be in direct fluid communication, wherein hydraulic fluid can directly flow between the components. Alternatively, the components can be indirectly in fluid communication, wherein fluid cannot flow directly between the components, but fluid pressure is transmittable between the components. As an example of indirect fluid communication, a fluid conduit extending between two components may include a movable piston slidably disposed therein such that the pressure of the fluid acting on one end of the piston causes the piston to move, thereby transmitting the pressure to the fluid acting on the other end of the piston while preventing fluid flow past the piston.

The term "normal boosted braking" refers to the operation of the described brake systems embodying the present invention, where the vehicle is on and the brake system has not entered into an ABS, TC, VSC, or DRP operation.

Pressurized brake fluid produced as a result of action by a master cylinder is also referred to as a "first pressurized fluid." Fluid pressurized in a fluid pressure generator circuit other than the master cylinder is referred to as a "high pressure fluid." High pressure fluid is metered into a supply conduit for normally boosted, ABS, TC, VSC, DRP, or regenerative braking operations and is referred to as a "second pressurized fluid." The terms "first pressurized fluid," "high pressure fluid," and "second pressurized fluid" are intended to refer to the same hydraulic fluid at different pressures in different portions of hydraulic brake systems during operation of the braking systems. It is to be understood that the pressure differences between these fluids are transitory and associated with the operation of the hydraulic braking system itself.

The brake systems described as embodiments of the present invention employ many similar components. These similar components are generally referred to using the same reference numbers.

Referring now to the drawings, there is illustrated in FIG. 1 a schematic representation of a vehicle system, indicated generally at 10, which is controlled by a method of the present invention. The system 10 includes a friction braking system 11a which typically includes components (described below) to control the application of hydraulic brake fluid to friction brakes. However, it is also contemplated that the friction brakes of the friction braking system 11a may be controlled by any suitable method including non-hydraulic methods such as electromechanical braking. The system 10 further includes a regenerative braking system 11b (described below) which converts kinetic energy of the vehicle into stored potential energy (typically in the form of electrical energy stored in the one or more batteries).

The friction braking system 11a includes a pair of frictional front wheel brakes 12a and 12b for braking front wheels 17 and 18, respectively, and a pair of frictional rear wheel brakes 13a and 13b for braking rear wheels 20 and 21, respectively. The brakes 12a, 12b and 13a, 13b can be any conventional friction brakes, such as drum and/or disc brakes and the vehicle system 10 may include a mix of drum and disc brakes. Each of the vehicle brakes are independently controlled by a brake module 26 (HCU) and an electrical control unit (ECU) 27 for controlling the operation of the HCU 26. The HCU 26 and the ECU 27 will be further described below.

A first brake circuit 44 is fluidically coupled between the HCU 26 and a front left vehicle brake 12a. A second brake circuit 46 is fluidically coupled between the brake module 27 and a front right vehicle brake 12b. A third brake circuit 47 is fluidically coupled between the HCU 26 and a rear left vehicle brake 13a. A fourth brake circuit 48 is fluidically coupled between the HCU 26 and a rear right vehicle brake 13b. Valves within the HCU 26 in cooperation with a master cylinder 29 are independently actuable for applying brake fluid to a respective brake circuit. The braking fluid applied through a respective brake circuit acts on a respective vehicle brake to apply a braking torque to a respective wheel for decelerating the vehicle. Wheel speed sensors 30, 32, 34, and 36, are disposed at each wheel for monitoring the wheel speed of each respective wheel and providing the sensed wheel speeds to the ECU 27.

A powertrain assembly 14 includes a rear axle 22 coupled to rear wheels 20 and 21. The powertrain assembly 14 can be any suitable system which provides forward acceleration to the vehicle, such as for example, a hybrid or pure electric powertrain assembly. In the embodiment shown in FIG. 1, the powertrain assembly 14 is a hybrid powertrain assembly connected only to the rear axle 22. The rear axle 22 is thus the driven axle of the vehicle. The hybrid powertrain assembly includes a combustion engine 15 connected to a driveshaft 39 which is coupled to a rear axle 22 via a transaxle 16 for providing output torque to the rear axle 22. The hybrid system also includes an electric motor 19 coupled to the driveshaft 39 for powering the wheels by an electrical means when the power output from the engine 15 is disengaged. It should be understood that the method of controlling the system 10 in accordance with the present invention can be used with any type of powertrain assembly, whether the powertrain assembly 14 is connected to the rear axle 22, front axle 23, both axles, use of a single electric motor or multiple electric motors each operable for driving a respective wheel.

The electric motor 19 is connected to an energy storage device 24, such as a battery. The electric motor 19 can provide forward acceleration of the vehicle via power supplied from the stored electrical energy of the energy storage device 24. The electric motor 19 of the powertrain assembly 14 preferably forms the regenerative braking system 11b and thus functions as a generator for providing regenerative braking when the powertrain assembly 14 is operated in a regenerative braking mode in which kinetic energy is captured from the rotation of the rear axle 22 and used to generate electrical energy which is stored within the energy storage device 24 for later use. The powertrain assembly 14 is preferably coupled to a selector switch (not shown) and the accelerator pedal 25. When the selector switch is set for regenerative operation and as the driver removes his foot from the accelerator pedal 25, the electric motor 19 ceases operation as an output drive device and is coupled to a battery charging circuit which induces an electromagnetic field in the electrical motor 19 causing the motor to function as an generator generating electrical energy. The motor 19 (when operating as a generator) is thus driven by the driveshaft 39 and acts as a load on the driveshaft 39. This simultaneously acts to slow the vehicle as well as generate electricity that is returned to the energy storage device 24. Alternatively, a respective electrical motor (not shown) and a respective generator (not shown) may be coupled to the powertrain assembly 14 separately as opposed to utilizing an integrated electric motor/generator.

The HCU 26 is a unit containing the hydraulic components that are utilized to control the operation of the vehicle system 10, such as various valves and hydraulic pumps. The ECU 27 contains electrical components operatively connected to components of the HCU 26, such as solenoid coils for operating valves in the HCU 26, and electric motors for driving the pumps (not shown) of the HCU 26, as well as other components of the vehicle system 10 to control braking of the vehicle. The ECU 27 may be integrated with the HCU 26 or may be remotely located from the HCU 26. The ECU 27 may be any kind of microprocessor device or string of microprocessor devices (i.e., components linked by a vehicular local area network such as a CAN bus). The ECU 27 is also operatively connected to a variety of vehicular sensors. The variety of sensors operatively connected to the ECU 27 typically may include a brake pedal pressure sensor 38 coupled to a brake pedal 28, one or more wheel speed sensors 30, 32, 34, and 36, a battery temperature sensor 40, a state of charge sensor 42, and an ambient temperature sensor 45. These sensors provide operational inputs to the ECU 27 that are preferably evaluated in real-time in order to cooperatively control the operation of the regenerative braking system 11b and the hydraulic braking system 11a.

Figure 2:
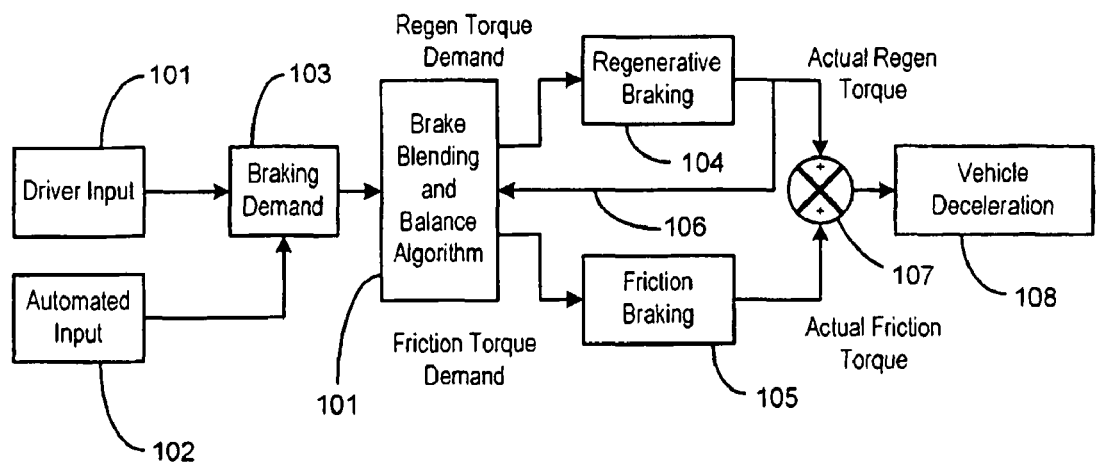
FIG. 2 is a schematic representation of the braking operation of the system of FIG. 1.

FIG. 2 is a schematic representation of the overall braking of the vehicle which is accomplished by controlling the front and rear wheel friction brakes via the friction braking system and controlling the powertrain assembly to produce braking via the regenerative braking system. A driver attempting to slow the vehicle enters a driver input demand 101 by the use of a brake pedal (shown in FIG. 1). Braking demand may also be developed from automated input 102 to the ECU such as TC, Autonomous Cruise Control (ACC), or radar collision avoidance systems or as a modification of the drivers demand such as occurs during ABS braking or VSC operation. The driver demand is sensed by the ECU 27.

In regenerative braking system, braking is controlled cooperatively by the ECU 27 and the PCM 49. The ECU 27 controls the frictional braking while the PCM 49 controls the regenerative braking. When the braking demand is received by the ECU 27, the ECU 27 and the PCM 49 cooperatively communicate with each other to blend the regenerative braking and frictional braking in accordance to a predetermined brake blending and balance algorithm 103. Based on the predetermined braking algorithm, braking controls are executed for regenerative braking 104 via the powertrain assembly and friction braking 105 via the friction brakes. Braking demand modes may include regenerative braking only, friction braking only, or a combination of both friction and regenerative braking. Since braking demands of the driver may be greater than that which regenerative braking may be able to supply, the available regenerative braking torque is constantly feedback to the brake algorithm 106. The actual regenerative braking torque is provided by the PCM to the ECU for determining what additional frictional braking would be required to decelerate the vehicle when the braking demand of the driver is greater than the braking torque of which the regenerative braking system can provide.

Depending on the braking blending and balance algorithm, the brake system will apply the regenerative braking and friction braking either independently or in combination with one another 107. If braking is applied in combination, both friction and regenerative braking operations are controlled so the operation of the regenerative braking and the friction braking are unnoticeable to the driver of the vehicle. The output of the combined braking operation will be substantially equal to the drivers braking demand which results in the intended vehicle deceleration as demanded by the driver of the vehicle. It is also preferred that the balance of torque between the front and rear axles be controlled by the ECU 108.

To maximize energy recovery, the vehicle system 10 should have sufficient bandwidth and limited time delay to develop braking force when requested by the driver. Sufficient bandwidth to maximize energy recovery provides for good pedal feel and smooth deceleration.

Figure 3:
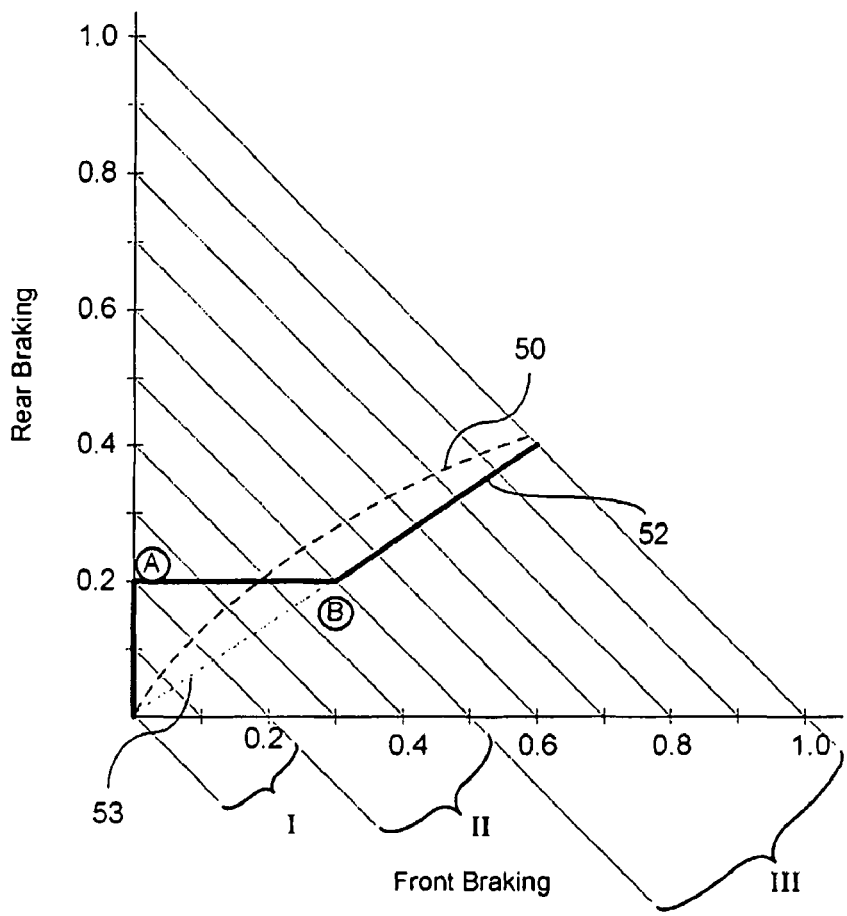
FIG. 3 is a graphical representation of a distribution of braking forces between the front and rear wheels of the vehicle with the system of FIG. 1.

Vehicles having only one driven axle, such as the vehicle system 10 shown in FIG. 1, should be controlled during braking and regenerative braking to provide sufficient balance between the front axle 23 and the rear axle 22. There is illustrated in FIG. 3 a first embodiment of an ideal brake balance between the front axle 23 and rear axle 22, indicated by a broken line plot 50. Note that the ideal brake balance curve 50 is for a two axle vehicle that incorporates only a friction braking system. It is also noted that the ideal brake balance 50, is not linear but slightly curved biased towards a frontal braking. This is preferred since a greater braking force on the front wheel brakes 12a and 12b are preferred than on the rear wheel brakes 13a and 13b due to the load shift toward the front wheels during deceleration. The desired brake balance line, generally shown at 53, is the determined is linear brake balance between the rear and front friction brakes that is front biased and in spaced relation to the ideal brake balance curve.

There is also illustrated in FIG. 3 a graphical representation of a preferred brake blending balance, indicated by the solid line plot 52. The preferred brake balance is accomplished by the method of the present invention, as described below. To maximize energy recovery, braking is initially performed only on the driven axle (i.e., rear axle 22 in reference to FIG. 1) up to a maximum capability of the regenerative braking system 11b as set forth by the PCM 49. There is illustrated in FIG. 3 a graphical representation of the preferred braking distribution, in accordance with the present invention, between the front wheel brakes 12a and 12b and rear wheel brakes 13 and 13b. It is noted that while the axes of the graph are termed in units of g's of deceleration, braking forces by friction braking as well as regenerative braking as applied, is proportional and equivalent to the deceleration, and as a result, braking forces and braking values may be utilized hereafter to describe the functionality of the braking operations of this graph and alternative embodiments.

To provide maximum energy recovery, generally only the regenerative braking system 11b is actuated to provide braking for the vehicle during relatively low deceleration, as indicated by phase I in FIG. 3. This is illustrated graphically as a vertical line indicating that only the deceleration of the vehicle is produced by the resistive torque generated by the electric motor 19 acting on to the driveshaft 39 which is coupled to on the rear axle 22. In this example, the maximum braking capability of the regenerative braking system 11b is about 0.2 g at a point A as shown in FIG. 3. During braking in phase I, the friction braking system 11a, that is, the friction wheel brakes 12a, 12b and 13a, 13b, are preferably not actuated. However, it is noted that to utilize regenerative braking, vehicle speed must be above a predetermined threshold (e.g., 5 mph). If less than the predetermined threshold, then vehicle friction braking will be provided by the balanced braking of the front set and rear set of friction brakes.

When the maximum regenerative torque of the regenerative braking system 11b is reached, as indicated by point A (i.e., first value of braking) of FIG. 3, and the driver desires additional braking, the ECU 27 actuates friction braking system 11a, and more specifically actuates friction braking on the opposite axle, i.e., the front wheel brakes 12a and 12b to provide balancing of the system 10. This is represented by a horizontal line in the Phase II of FIG. 3. The braking force of the wheel brake 13a and 13b is applied until the overall braking torque meets a desired balance, as indicated by point B (i.e., second value of braking) and within the phase II, as shown in FIG. 3. During the period of hydraulic braking and regenerative braking in phase II, the ECU 27 preferably does not actuate the rear wheel brakes 13a and 13b.

If a higher braking force is demanded by the driver's input, such as that shown in phase III of FIG. 3, the front wheel brakes 12a, 12b and the rear wheel brakes 13a, 13b, as well as the regenerative mode of the powertrain assembly 14 (that is, the friction braking system 11a and the regenerative braking system 11b) are actuated and increased as necessary to maintain the desired balance between the front and rear axles of the vehicle until the vehicle fully decelerates to the drivers braking demand (i.e., third value of braking of braking). The combined regenerative braking and frictional braking apply a combined braking force, in phase III, in which braking forces of the front wheels and said rear wheels are proportional such that a ratio line defined by a ratio of braking forces between the front wheels and the rear wheels define a plot line that is substantially equal to a ratio line defining a desired brake balance 53. During the brake apply in phase III, regenerative braking may gradually decrease if the regenerative braking force can no longer assist the friction braking. This may be the result of the energy storage device becoming capacitized where no additional energy can be stored.

Figure 4:
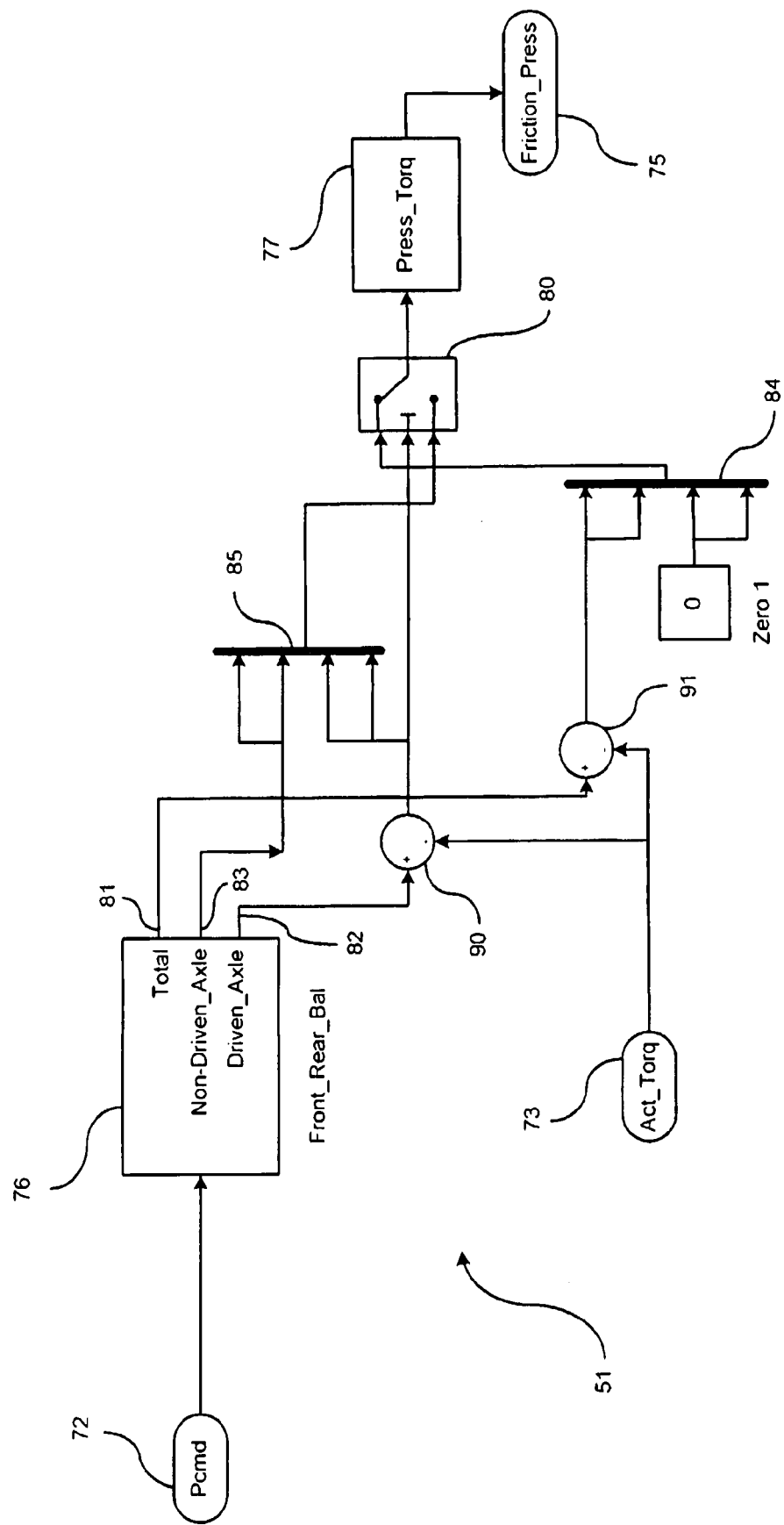
FIG. 4 is a schematic representation of a control algorithm of the system of FIG. 1.

There is illustrated in FIG. 4, a preferred control algorithm, indicated generally at 51, for performing the brake balance distribution as shown in FIG. 3. The algorithm generally has two inputs: $P_{cmd}$ 72, and Act_Torq 73. The input $P_{cmd}$ 72 is the hydraulic brake fluid pressure that would be required to operate the friction brakes 12a, 12b and/or 13a, 13b if no regenerative braking was available. The value of this input can be determined by another algorithm (not described herein) that calculates the driver's desire for overall braking. The input Act_Torq 73 is the actual braking torque that is applied by the regenerative braking system 11b as a result of a regenerative brake torque request.

Figure 5:
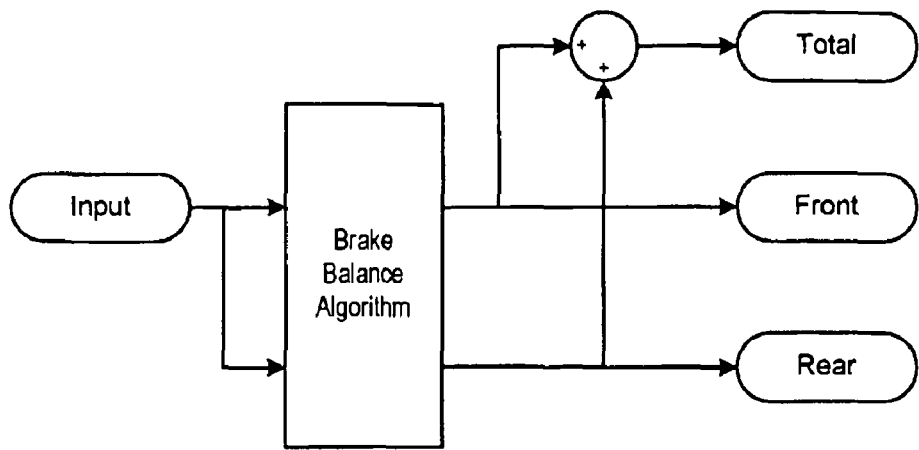
FIG. 5 is a schematic representation of a control algorithm for a sub function illustrated in FIG. 4.

The algorithm of FIG. 4 includes output Friction_Press 75. The output Friction_Press 75 is the pressure required in each of the four wheel brakes 12a, 12b and 13a, 13b which will be necessary to meet the driver's demand for braking beyond that supplied by the regenerative braking system. The algorithm further includes two sub functions: Front_Rear_bal 76 (shown in FIG. 5) and Press_Torq 77.

When the braking demand of the driver is input (i.e., $P_{cmd}$ 72), the $P_{cmd}$ input is provided to the Front_Rear_bal 76. The sub function Front_Rear_bal 76 determines the total torque equivalent of the $P_{cmd}$ input as well as the ideal or desired balance torque required for each of the driven and non-driven axles of the vehicle. These torques are based on a brake balance relationship that can be determined from vehicle parameters and customer design requirements. The algorithm of FIG. 4 generates one of three different braking strategies depending on the braking demands of the driver. The three braking strategies include regenerative braking only, regenerative braking and friction braking of the vehicle brakes of the only the non-driven axle, and regenerative braking and friction braking of the friction brakes of the non-driven and driven axle.

The determination for using the first braking strategy where only regenerative braking is utilized is described as follows. An Act_Torq 73 is provided by the PCM 49 to the control algorithm 51 and is the regenerative braking force that is to be applied by the powertrain assembly 14 for vehicle deceleration. The Driven_Axle 82 and the Act_Torq 73 are summed at summation block 90. (Braking signals are typically negative, however, for descriptions purposes all brake apply signals will be discussed herein are in absolute values. The summation blocks are appropriately marked to input a positive or negative value for summing purposes.) If the sum is negative, switch 80 is actuated to operatively connect output of gate 84 to the Press_Torq 77. Thereafter, the Act_Torq 73 and Total 81 are summed at summation block 91. If the Act_Torq 73 and Total output 81 are equal, then their sum is zero which results in a zero value input to the sub function Press_Torq 77 and a zero value output from the Friction_Press 75. The result is no friction braking contributed by both the non-driven axle and the driven axle since the regenerative braking system can independently meet the braking demands of the driver.

If the summation at block 91 indicated that the Act_Torq 73 is less than the Total 81, (i.e., positive sum) then the regenerative braking system has insufficient capacity to meet the entire braking demands that is required by the driver's input and either the friction braking of the non-driven axle or the friction braking of both the non-driven and driven axle must be used in cooperation with regenerative braking.

A determination is then made whether the friction braking of only the non-driven axle should be applied or both the non-driven and driven axle should be applied in cooperation with the regenerative braking torque. As discussed earlier, the sub function Front_Rear_bal 76 determines the friction brake balance required to meet the driver's braking demands (i.e., without regenerative braking). The Driven_Axle 82 output of the Front_Rear_bal 76 is summed with the Act_Torq 73 at summation block 90. If the result is negative (i.e., Act_Torq 73 is greater than that which is demanded by the Driven_Axle 82), then the driven axle does not require any braking and the driver's braking demand can be satisfied by the regenerative braking system and the friction braking of only the non-driven axle. Switch 80 is actuated to operatively connect gate 84 to sub function Press_Torq 77.

A further determination is made to determine the amount of friction braking torque required by the non-driven axle. The Act_Torq 73 is summed with the Total 81 (i.e., total braking demand by the driver) at summation block 91. The result is the amount of braking force that is required to be supplied by the non-driven axle. This is the amount of braking force that is required of the non-driven axle, in addition to the regenerative braking force, to meet the braking demands of the driver.

The determination for using the third braking strategy where regenerative braking and friction braking of both the non-driven axle and the driven axle are utilized is described as follows. If the summation at block 90, between the Act_Torq 73 and the Driven_Axle 82, is positive (i.e., the driven axle braking demand is greater than the actual regenerative braking torque), then this indicates that there is insufficient regenerative braking torque to provide a braking force by the regenerative braking system that would meet the requirements that are demanded by the driven axle, in addition to the braking requirements of the non-driven axle. Switch 80 is actuated to operatively connect gate 85 to the sub function Press_Torq 77. The difference between the Act_Torq 73 and the Driven_Axle 82 represents the amount of braking force that is to be applied by the friction brakes of the driven axle. The friction braking requirements of the friction brakes of the Non_Driven Axle 83 as determined by the Front_Rear_bal 76 in addition to the difference as determined above for the Driven_Axle 82 are communicated to the sub function Press_Torq 77 via gate 85 so that the friction braking from both the non-driven axle and the driven axle are utilized, in addition to the regenerative braking.

The sub function Press_Torq 77 converts the friction torque request to a pressure command as represented by Friction_Press 75.

The following formulas summarize the determination of the Friction_Press signal:
If the magnitude of the Act_Torq is greater than the demand of the axle torque:

Non-driven friction_press =
$$\begin{cases} 0, \text{ for } |Act\_Torq| \geq |Total\ torque| \\ Total\ torque - Act\_Torq, \text{ for } |Act\_Torq| < |Total\ torque| \end{cases}$$

Drive wheel Friction_press = 0;

If the magnitude of the Act_Torq is less than or equal to that of the desired Driven_Axle torque:

Non-driven wheel Friction_press=desired non-driven_axle torque

Driven wheel Friction press=desired driven_axle torque-Act_Torq

Figure 6:
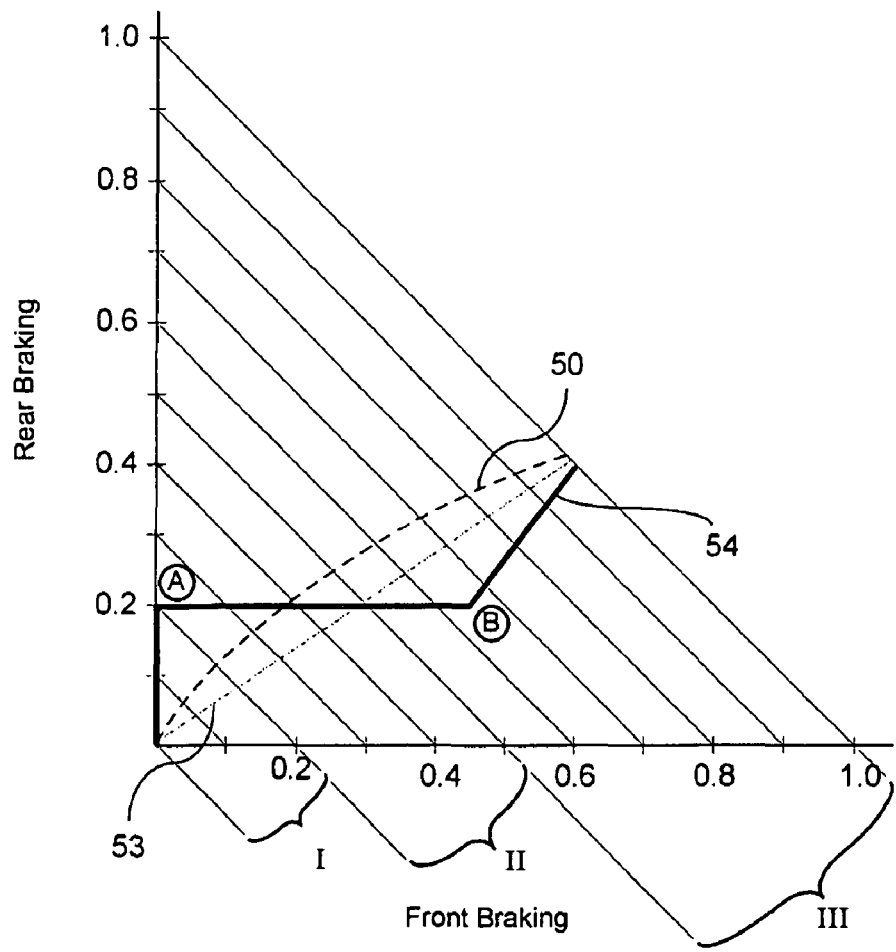
FIG. 6 is a graphical representation of a second embodiment of the invention illustrating a braking distribution between the front and rear wheels of the vehicle.

There is also illustrated in FIG. 6 a second preferred embodiment of the present invention. FIG. 6 illustrates a graphical representation of an alternate brake blending balance plot, indicated by the solid line plot 54. This graphical representation is similar to that shown and described with respect to FIG. 3 above. One of the differences is that phase II of FIG. 6 is enlarged, thereby shifting point B so that rear friction braking will be actuated and added to the front friction braking at a later value compared to the braking distribution of FIG. 3. As shown in FIG. 3, point B is generally lies along the linear slope of the desired brake balance 53 (for brake systems not having regenerative braking), which would generally extend through the zero axis. Comparatively, as shown in FIG. 6, the front friction only brake distribution extends farther beyond the linear slope of the desired brake balance 53, thereby increasing phase II. In certain circumstances it may be desirable to control a brake system as shown in FIG. 3 since it is closer to an ideal brake balance 50. However, since the combination of front and rear friction brake blending in FIG. 3 is performed at a lower braking force in comparison to that of FIG. 6, the pressure balance and operation of the front and rear brake circuits should be relatively smooth and controllable, since more braking is commonly used in lower braking forces. To accomplish this, it may be necessary for the brake system to use relatively expensive proportional valves and pressure transducers. For economical reasons, it may therefore be desirable to control a brake system as shown in FIG. 6 with a simpler brake circuit utilizing less expensive valves. Since front and rear brake blending only occurs at relatively high braking forces and relatively infrequent, it may not be necessary to provide such as smooth and controllable brake system.

The control braking strategy as shown in FIG. 6 is ideally suited for a rear wheel drive vehicle having a simple valve configuration. In order to blend rear friction braking with regenerative and front friction braking, it has been known to use methods which require accurate rear axle pressure control. These methods control braking in such a way that the front to rear brake balance is maintained appropriately. For brake blending using rear pressure control a simple hydraulic circuit can be used that is the same or similar to a standard Anti-Lock Braking System (ABS) circuit. This is done by isolating pressure to the rear wheels at a relatively low or zero pressure during a brake apply, such that the friction and regenerative brake blending is done mainly with front friction braking. Rear friction braking is preferably only done at higher deceleration levels, when the maximum braking capability of the vehicle is needed.

The benefit of this method is that the rear friction braking does not need to be as accurate or as smooth as it otherwise would need to be. The driver is more aware of brake smoothness and accuracy at lower deceleration levels, when rear friction braking is limited or zero. Rear pressure blending which is not attempted at these low deceleration levels does not result in poor braking control. At higher deceleration levels, the driver does not need or notice as easily that the rear braking is not controlled as accurately.

At deceleration levels below that which cause the rear friction braking to be increased, the brake balance is increasingly front biased as front braking is increased relative to the rear regenerative braking. This is considered a safe, stable braking situation.

FIG. 6 illustrates this brake balance strategy. In a first phase of control, indicated as phase I, regenerative braking is initially applied to the rear wheels, preferably without any friction braking to point A. In a second phase of control, indicated as phase II, for decelerations higher than the regenerative braking alone can apply, front friction braking is then applied to the front wheels up to point B, while maintaining regenerative braking of the rear wheels constant. In a third phase of control, indicated as phase III, for decelerations above point B (up to the point of the maximum braking capability of the vehicle, i.e., third value) rear friction braking is then applied. The combined regenerative braking and frictional braking apply a combined braking force, in phase III, in which braking forces of the front wheels and said rear wheels are proportional such that a ratio line defined by a ratio of braking forces between the front wheels and the rear wheels defines a plot line that nears a ratio line defining a desired brake balance 53 as the combined vehicle braking approaches the maximum capability braking of the vehicle. Preferably, the front friction braking is applied is greater than the rear friction braking so that a front bias braking balance control is maintained.

In the third phase of control (phase III), the blending of front and rear friction braking may also include the reduction, or phasing out, of rear regenerative braking at higher decelerations, for example for stability control of the vehicle. This reduction in rear regenerative braking may coincide with or precede the application of rear friction braking.

The hydraulic circuit used to control pressure could be the same as is found in state of the art ABS applications, or modified versions of those such as changes made to make the valves operate in a more proportional manner.

One of the advantages of this method over conventionally known systems is that the rear pressure control by the ECU 27 could be performed using rear wheel slip information as is found in conventional ABS applications.

Figure 7:
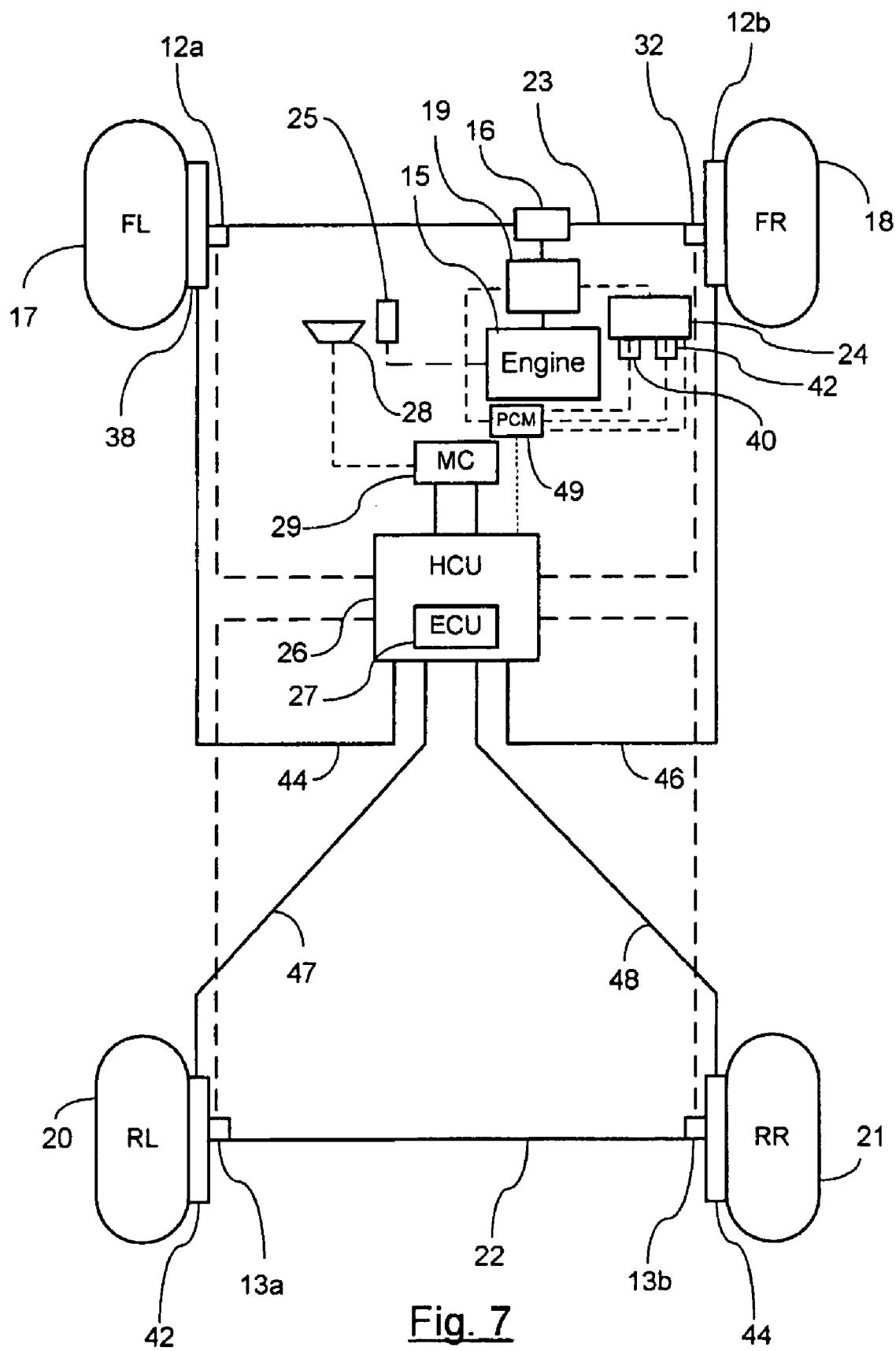
FIG. 7 is a schematic representation of a vehicular regenerative brake system having an electric powertrain assembly and a friction brake system controlled in accordance with a third embodiment of the present invention.

FIG. 7 illustrates schematic representation of a vehicular regenerative brake system having a hybrid electric powertrain assembly and a friction brake system according to a third preferred embodiment of the present invention. The vehicle system is a front wheel drive system utilizing a combustion engine 15 and an integrated motor/generator 19 for powering the movement of the vehicle. The engine 15 and the integrated motor/generator 19 are each connected to the driveshaft 39 which is coupled to the front axle 23 via the transaxle 16. As discussed earlier, the integrated motor/generator 19 may include a separate electric motor and separate generator that cooperatively provide an output torque for driving the front vehicle wheels 17 and 18, providing an electromagnetic force for regenerative braking the front vehicle wheels 17 and 18, and for recapturing energy to be stored in the energy storage device 24.

Figure 8:
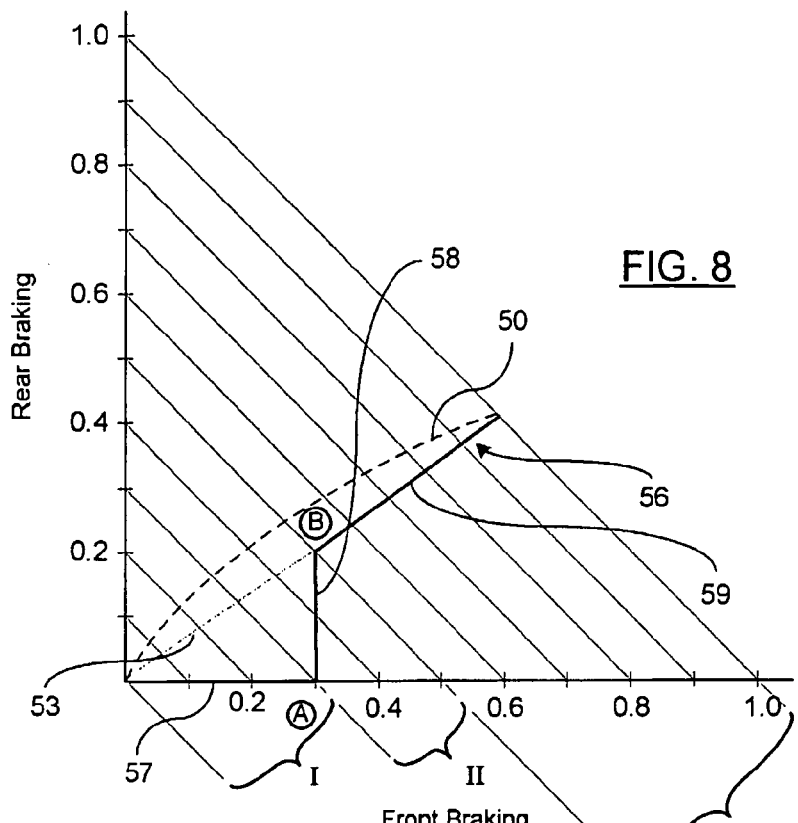
FIG. 8 is a graphical representation of the braking distribution between the front and rear wheels of the vehicle according to a fourth embodiment of the present invention.

FIG. 8 is a graphical representation of the braking distribution between the front and rear wheels of the vehicle for a front wheel drive vehicle utilizing regenerative braking as indicated by the portion of the solid line plot 56. As discussed earlier, only regenerative braking (no frictional braking) is performed during low deceleration demands (when above a speed at which regenerative braking is available). This is indicated by phase I of FIG. 8. Regenerative braking is performed on the front driven axle of the front wheel drive system. The regenerative braking portion is shown by the solid line plot 57 in FIG. 8 and is maximized at 0.3 g at a point A. Any additional braking demands as demanded by the driver input requires additional braking assistance from frictional braking of the rear vehicle brakes 13a and 13b. This is represented by the vertical increasing braking force, as shown in phase II by the portion of the solid line plot 58, which extends along the vertical axis to 0.2 g at point B. During the brake apply of the rear vehicle brakes 13a and 13b, regenerative braking is still being applied and energy is being recaptured from the integrated electric motor/generator and stored in the energy storage device 24 as illustrated in phase II. If higher braking demands are required, then a brake blending balance between the rear vehicle brakes 13a, 13b and the front vehicle brakes 12a, 12b is provided and is shown by the solid line plot 59 in phase III. At point B, brake balance between vehicle brakes 12a, 12b and 13a, 13b follows the desired braking balance, as indicated by the broken line at 53.

Applying a braking force to a front wheel drive vehicle provides greater vehicle stability control with respect to yawing of the vehicle than if braking force were applied to a rear wheel drive vehicle. For example, applying a high braking force on a respective road surface condition for a rear wheel drive vehicle may result in yawing of the rear portion of the vehicle.

Figure 9:
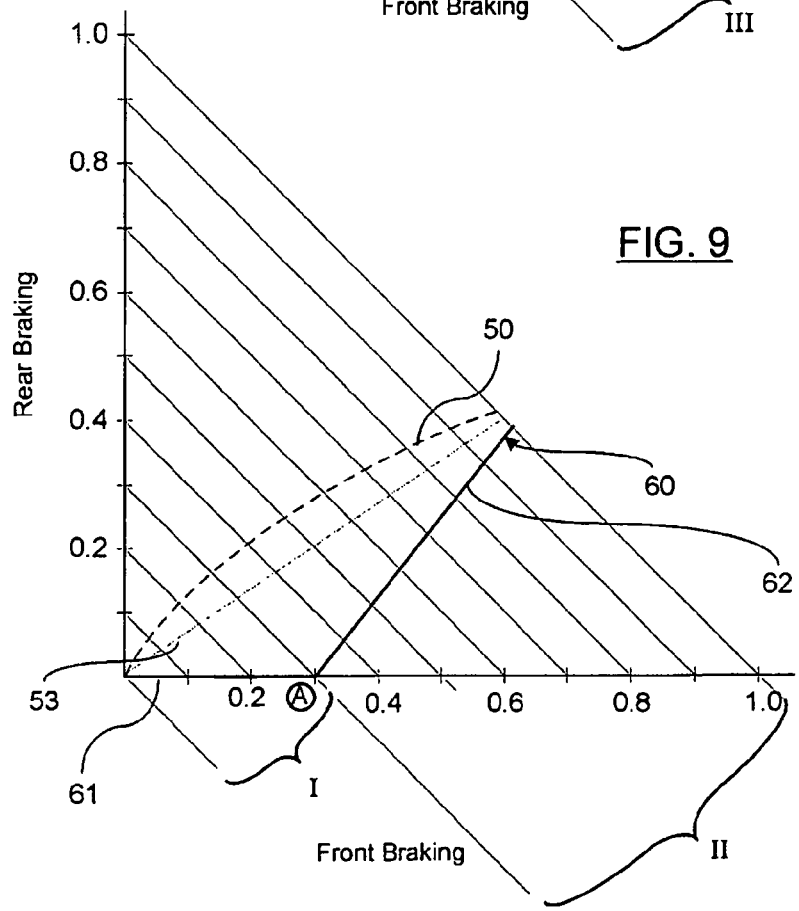
FIG. 9 is a graphical representation of the braking distribution between the front and rear wheels of the vehicle according to a fifth embodiment of the present invention.

Applying the same braking force to a front wheel drive vehicle will lessen or eliminate vehicle yawing. As a result, it is not required that frictional braking be applied solely to a respective axle prior to brake blending both the front and rear vehicle brakes. Referring now to FIG. 9, vehicle brake blending balance is indicated generally by the solid black line plot 60. Regenerative braking is applied to the front axle of a vehicle without any frictional braking as indicated by the portion of the solid black line plot 61 in phase I. After regenerative brake apply has peaked and can no longer apply an increased regenerative braking force on the front axle, an additive braking force is applied by both the front vehicle brakes 12a, 12b and rear vehicle brakes 13a, 13b. The regenerative braking system and the frictional braking system apply a combined braking force such that a ratio of front axle and rear axle braking forces nears the desired braking balance 60. This is indicated by the portion of the solid black line plot 62 of phase II.

Figure 10:
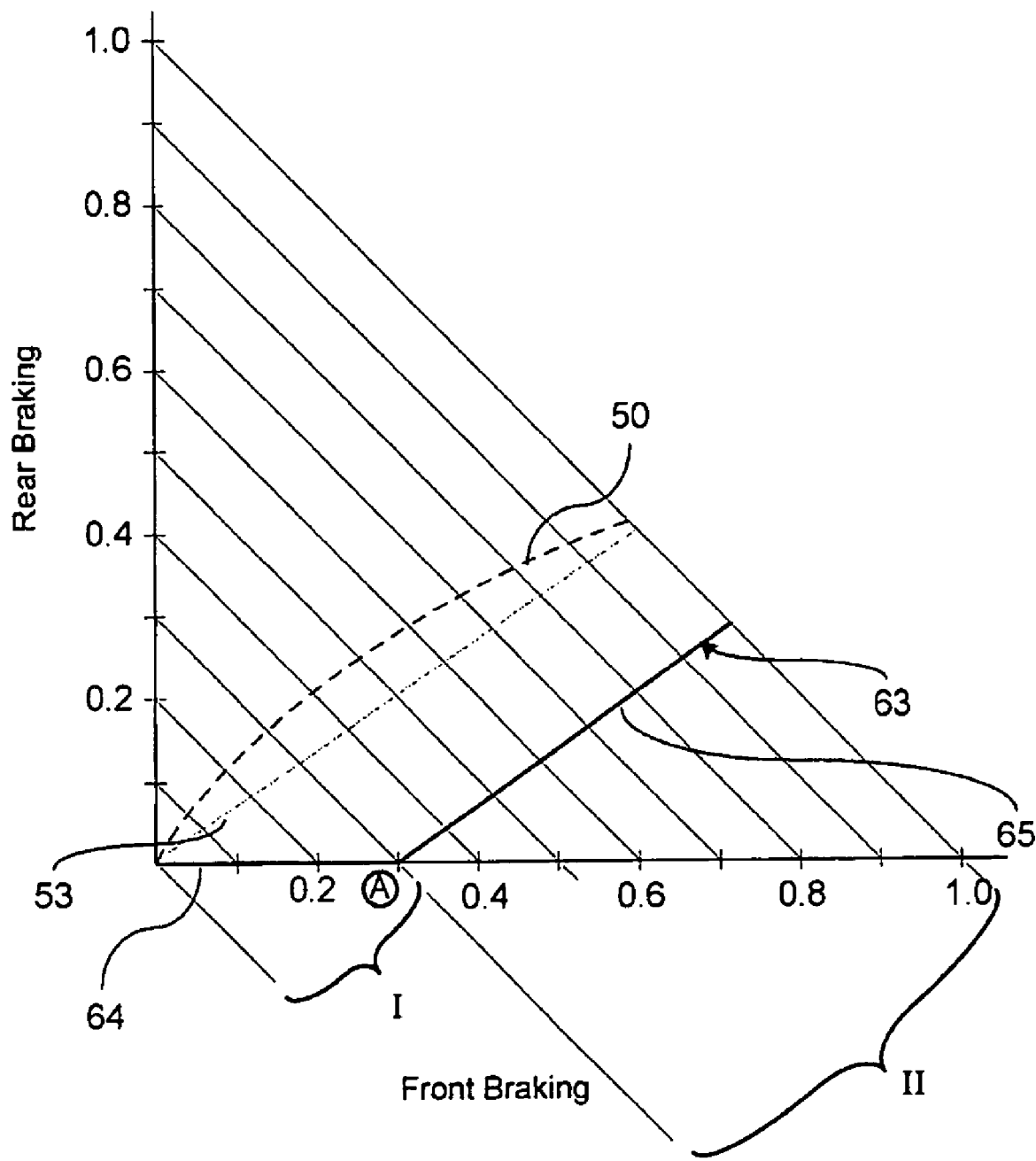
FIG. 10 is a graphical representation of the braking distribution between the front and rear wheels of the vehicle according to a sixth embodiment of the present invention.

FIG. 10 illustrates yet another preferred embodiment of a braking strategy for a front wheel drive vehicle. Similar to the regenerative braking as shown in FIG. 9, vehicle brake blending balance is shown generally by the black line plot 63. The regenerative braking applied less frictional braking is indicated in phase I from 0 to 0.3 g at point A as illustrated by solid line plot 64. At point A, if higher braking demands are required by the driver, then frictional braking of both the front vehicle wheels 12a, 12b and rear vehicle wheels 13a, 13b are applied. The combined regenerative braking and frictional braking apply a combined braking force in which braking forces of the front wheels and said rear wheels are proportional such that a ratio line defined by a ratio of braking forces between the front wheels and the rear wheels defines a plot line that is parallel to a ratio line defining a desired brake balance 53. The combined braking force is shown generally by the portion of the black line plot 65 in phase II. Similar, to the braking strategy of FIG. 9, the individual axle friction brake applied prior to the combined frictional brake apply is not required for the front wheel drive vehicle system.

Figure 11:
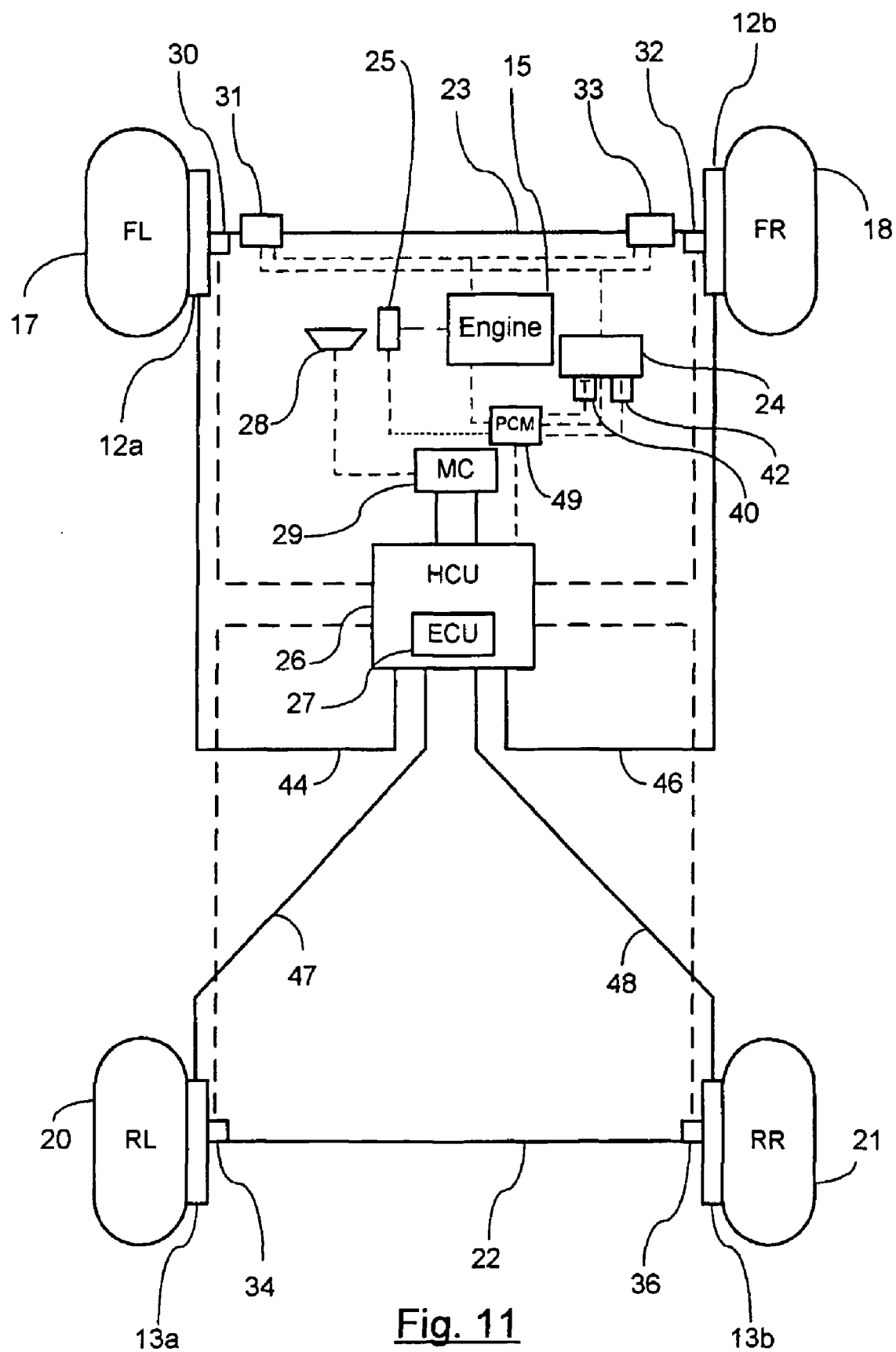
FIG. 11 is a schematic representation of a vehicular regenerative brake system having an electric powertrain assembly and a friction brake system controlled in accordance with a seventh embodiment of the present invention.

FIG. 11 illustrates yet another preferred embodiment of the present invention illustrating a pure electric drive vehicle system. The vehicle system, as shown in FIG. 11, utilizes a plurality of electric motors to drive the vehicle system without the use of an engine as shown in earlier embodiments. The vehicle system includes a first electric motor 31 coupled to the front axle 23 for driving the front left wheel 30 when energized. When the first electric motor 31 is denergized from driving the front left wheel 17, the first electric motor 31 may perform like a generator for placing an electromagnetic load the left side portion of the front axle 23 for performing a regenerative braking operation on the front left wheel 17. Similarly, a second electric motor 33 is coupled to a right side portion of the front axle 23 for driving the front right wheel 21 when energized. When the second electric motor 33 is denergized from driving the front right wheel 18, the second electric motor 33 may perform like a generator for placing an electromagnetic load on the right side portion of the front axle 23 for performing a regenerative braking operation on the front right wheel 18. Braking strategies for combined regenerative braking and friction braking may be applied as discussed earlier for front wheel drive system.

In other preferred embodiments, a single electric motor may be utilized on the driveshaft of the vehicle as opposed to utilizing two electric motors for driving each driveable wheel and recapturing energy from each driveable wheel. In addition, the pure electric vehicle as described using a single or dual electric motor may be utilized on a rear wheel drive system.

In summary this invention includes a method for controlling the braking of a vehicle that has a first set of friction brakes for applying a first apply brake force to a first set of wheels and a second set of friction brakes for applying a second brake apply force to a second set of wheels. A powertrain assembly is coupled to the second set of wheels. The powertrain assembly includes a regenerative braking unit capable of recapturing kinetic energy from the second set of wheels. The vehicle is braked vehicle in a first phase of control using regenerative braking to brake the second set of wheels to achieve up to a first value of braking. The vehicle is braked in a second phase of control using the regenerative braking to maintain braking of the second set of wheels at the first value of braking force while selectively applying the first friction brakes to the first set of wheels up to a second value of braking.

In yet another aspect of the present invention, a method is provided for controlling the braking of the vehicle in a third phase of control by selectively using the first set of friction brakes to brake the first set of wheels and using the second set of friction brakes to brake the second set of wheels together with a desired amount of regenerative braking when above the second value of braking.

In yet another aspect of the present invention, a method is provided for controlling the braking of the vehicle where when braking is applied in the third phase of control, the friction braking of the first set of wheels is greater the friction braking of the second set of wheels.

In yet another aspect of the present invention, a method is provided for controlling the braking of the vehicle where when braking is applied in the third phase of control, the braking of the first set of friction brakes is proportional to the braking of the second set of friction brakes.

In yet another aspect of the present invention, a method is provided for controlling the braking of the vehicle an amount of braking applied to the first set of friction brakes and the second set of friction brakes is determined as a function of a difference between an input vehicle braking demand and the actual regenerative braking applied.

In yet another aspect of the present invention, a method is provided for controlling the braking of the vehicle the step of braking the vehicle in the second phase of control further includes selectively applying the second set of friction brakes together with the first set of friction brakes up to the second value of braking.

In yet another aspect of the present invention, a method is provided for controlling the braking of the vehicle where the first set of wheels are front wheels of the vehicle and the second set of wheels are rear wheels of the vehicle.

In yet another aspect of the present invention, a method is provided for controlling the braking of the vehicle where the first set of wheels are coupled to a non-driven axle of the vehicle and the second set of wheels are coupled to a driven axle of the vehicle.

In yet another aspect of the present invention, a method is provided for controlling the braking of the vehicle where when braking the vehicle in the third phase of control, the desired amount of regenerative braking decreases as an amount of braking applied by the second set of friction brakes increases.

In yet another aspect of the present invention, a method is provided for controlling the braking of the vehicle where when braking the vehicle in the third phase of control, the desired amount of regenerative braking is decreased preceding the application of the second set of friction brakes.

In yet another aspect of the present invention, a method is provided for controlling the braking of the vehicle where when braking the vehicle in the first phase of control, no friction brakes are used.

In yet another aspect of the present invention, a method is provided for controlling the braking of the vehicle where the first value of braking is a maximum output of the regenerative braking torque.

In yet another aspect of the present invention, a method is provided for controlling the braking of the vehicle where braking from only the first set of brake and the second set of brakes is applied if a vehicle speed of the is less than a predetermined threshold.

In yet another aspect of the present invention, a method is provided for controlling the braking of the vehicle that has a first set of friction brakes for applying a first brake apply force to a first set of wheels coupled to a non-driven axle, a second set of friction brakes for applying a second brake apply force to a second set of wheels coupled to a driven axle. A powertrain assembly is coupled to the driven axle. The powertrain assembly includes a regenerative braking unit capable of recapturing kinetic energy from driven axle. The vehicle is braked in a first phase of control using regenerative braking to brake the driven axle to achieve up to a first value of braking force. The vehicle is braked in a second phase of control using the regenerative braking to maintain braking of the driven axle at the first value of braking force while selectively applying the first friction brakes to the first set of wheels of the non-driven axle up to a second value of braking force. The vehicle is braked in a third phase of control by selectively applying the first friction brakes to the first set of wheels and the second friction brakes to the second set of wheels together with a desired amount of regenerative braking when above the second value of braking force.

In yet another aspect of the present invention, a method is provided for determining brake control between a non-driven axle and a driven axle in a braking system. The braking system includes an electric motor for applying a regenerative braking force to the driven axle. The braking system further includes a first set of friction brakes for applying a first brake apply force to a first set of wheels coupled to the non-driven axle and a second set of friction brakes for applying a second brake apply force to a second set of wheels coupled to the driven axle. A pressure input command is received relating to a total braking force for braking a vehicle. A determination is made if an actual regenerative braking force is greater than the total braking force demand. If the actual regenerative braking force is greater than the total braking force demand, then the regenerative braking force is used to brake the driven axle up to the total braking force demand. If the actual regenerative braking force is less than the total braking force demand, then the first brake apply force is determined for applying to the first set of friction brakes of the non-driven axle and the second brake apply force is determined for applying to the second set of friction brakes of the driven axle. The sum of the first brake apply force and the second brake apply force being equal to the total braking force demand. A determination is made whether the second brake apply force is greater than the actual regenerative braking force. If the actual regenerative braking force is greater than the second brake apply force, then the actual regenerative braking force is applied to the driven axle up to the second brake apply force and applying the first braking force to the first set of friction brakes of the non-driven axle. If the actual regenerative braking force is less than the second brake apply force, then determining the brake apply difference between the second braking force and the actual regenerative braking force. The actual regenerative braking force is applied to the driven axle. The first brake apply force is applied to the first set of friction brakes of the non-driven axle. The brake apply difference is applied to the second set of friction brakes of the driven axle, in response to the regenerative braking is force being less than the second brake apply force.

In yet another aspect of the present invention, a method is provided for determining brake control between a non-driven axle and a driven axle in a braking system where the actual regenerative braking force applied to the driven axle is applied up to a first value of braking force.

In yet another aspect of the present invention, a method is provided for determining brake control between a non-driven axle and a driven axle in a braking system where the actual regenerative braking force applied to the driven axle and the first brake apply force applied to the first set of friction brakes of the non-driven axle are cooperatively applied up to a second value of braking force.

In yet another aspect of the present invention, a method is provided for determining brake control between a non-driven axle and a driven axle in a braking system where the actual regenerative braking force applied to the driven axle, and the first brake apply force applied to the first set of friction brakes of the non-driven axle, and the brake force difference applied to the second set of friction brakes of the driven axle are cooperatively applied above the second value of braking force.

In yet another aspect of the present invention, a method is provided for determining brake control between a non-driven axle and a driven axle in a braking system where the actual regenerative braking force decreases when above the second value of braking.

In yet another aspect of the present invention, a method is provided for determining brake control between a non-driven axle and a driven axle in a braking system where braking from only the first set of friction brakes and the second set of friction brakes is applied if a vehicle speed is less than a predetermined threshold.

In yet another aspect of the present invention, a method is provided for controlling a vehicular regenerative braking system that includes a first set of friction brakes for applying a first brake apply force to a first set of wheels coupled to the non-driven axle. A second set of friction brakes applies a second brake apply force to a second set of wheels coupled to a driven axle. A powertrain assembly is coupled to the second set of wheels. The powertrain assembly includes a regenerative braking unit for applying a regenerative braking force to the driven axle. A desired brake balance line representative of a ratio of braking forces between a first set of brakes of a non-driven axle and a second set of brakes of a driven axle is determined. The desired brake balance ratio includes a first, a second, and a third control phase. The regenerative braking force is applied to the driven axle in the first control phase up to a first value of brake force. The first brake apply force and the regenerative braking force are cooperatively applied in the second control phase up to a second value where the second value is in a region of front bias braking balance control. The second brake apply force together with the first brake apply force and the regenerative braking force are cooperatively applied in a third phase of control up to a third value of braking.

In yet another aspect of the present invention, a method is provided for controlling a vehicular regenerative braking system where the third value of braking is disposed in the region of the front bias braking balance control.

In yet another aspect of the present invention, a method is provided for controlling a vehicular regenerative braking system where the third value of braking is disposed on the desired brake balance line.

In yet another aspect of the present invention, a method is provided for controlling a vehicular regenerative braking system where the second value of braking is disposed on the desired brake balance line.

In yet another aspect of the present invention, a method is provided for controlling a vehicular regenerative braking system where the second brake apply force is applied in the second control phase.

In yet another aspect of the present invention, a method is provided for controlling a vehicular regenerative braking system where the total of the regenerative braking force, the first brake apply force, and the second brake apply force is proportional between the non-driven axle and the second set of wheels of the driven axle. The ratio of braking forces between the non-driven axle and the driven axle increases along a line parallel to the desired brake balance line throughout the second control phase as a total brake demand increases.

In yet another aspect of the present invention, a method is provided for controlling a vehicular regenerative braking system where the regenerative braking force is not applied if a vehicle speed is less than a predetermined threshold.

The principle and mode of operation of this invention have been explained and illustrated in its preferred embodiment. While the embodiments of the invention have been described as used in conjunction with regenerative braking, it is understood that these embodiments and variations thereof can also be incorporated in conventionally fueled vehicles without regenerative braking. It is further contemplated that the method of control of this invention may be applied to vehicle having regenerative braking available on one, two, or more axles and may be applied to vehicles having regenerative braking on any combination of a rear axle, a group of rear axles, a front axle, a group of front axles, and one or more axles between a front and rear axle. Further, it is understood that this invention may be practiced otherwise than as specifically explained and illustrated without departing from its spirit or scope.

TABLE OF REFERENCE NUMBERS 10 vehicle system
11a friction braking system
11b regenerative braking system
12a, 12b frictional front wheel brakes
13a, 13b frictional rear wheel brakes
14 powertrain assembly
15 engine
16 transaxle
17, 18 front wheels
19 electric motor
20, 21 rear wheels
22 rear axle
23 front axle
24 energy storage device
25 accelerator pedal
26 brake module (HCU)
27 electrical control unit (ECU)
28 brake pedal
29 master cylinder
30, 32, 34, 36 Wheel speed sensors
31 first electric motor
33 second electric motor
38 brake pedal pressure sensor
39 driveshaft
40 battery temperature sensor
42 state of charge sensor
44 first brake circuit
45 ambient temperature sensor
46 second brake circuit
47 third brake circuit
48 fourth brake circuit
49 PCM
50 ideal brake balance
51 preferred control algorithm
52 preferred brake blending balance
53 desired brake balance
54 brake blending balance
57 regenerative braking portion
58 regenerative and rear braking
59 brake blending balance
60 brake blending balance
61 regenerative braking portion
62 combined braking force portion
63 brake blending balance
64 regenerative braking
65 combined braking force portion
72 $P_{cmd}$
73 Act_Torq
74 Regen_Torq_Req
75 Friction_Press
76 Front_Rear_bal
77 Press_Torq
79 switch
80 switch
81 Total
82 Driven_Axle
83 Non_Driven Axle
84 gate
85 gate
90 summation black
91 summation block

The invention claimed is:

1. A method of controlling the braking of a vehicle that has a first set of friction brakes for applying a first apply brake force to a first set of wheels, a second set of friction brakes for applying a second brake apply force to a second set of wheels, and a powertrain assembly coupled to said second set of wheels, said powertrain assembly including a regenerative braking unit capable of recapturing kinetic energy from said second set of wheels, said method comprising the steps of:
braking said vehicle in a first phase of control using regenerative braking to brake said second set of wheels to achieve up to a first value of braking; and
braking said vehicle in a second phase of control using said regenerative braking to maintain braking of said second set of wheels at said first value of braking force while selectively applying said first friction brakes to said first set of wheels up to a second value of braking with the step of applying said first friction brakes to said first set of wheels in said second phase of control exceeding a front bias braking balance control of a desired brake balance line.

2. The method of claim 1 further comprising the step of braking said vehicle in a third phase of control by selectively using said first set of friction brakes to brake said first set of wheels and using said second set of friction brakes to brake said second set of wheels together with a desired amount of regenerative braking when above said second value of braking.

3. The method of claim 2 wherein when braking is applied in said third phase of control, said friction braking of said first set of wheels is greater than said friction braking of said second set of wheels for maintaining front bias balance braking control.

4. The method of claim 2 wherein when braking is applied in said third phase of control, said braking of said first set of friction brakes is proportional to said braking of said second set of friction brakes.

5. The method of claim 2 wherein the amounts of braking applied to said first set of friction brakes and said second set of friction brakes are determined as a function of a difference between an input vehicle braking demand and the actual regenerative braking applied.

6. The method of claim 2 wherein said first set of wheels are front wheels of said vehicle and said second set of wheels are rear wheels of said vehicle.

7. The method of claim 2 wherein said first set of wheels are coupled to a non-driven axle of said vehicle and said second set of wheels are coupled to a driven axle of said vehicle.

8. The method of claim 2 wherein, when braking said vehicle during said third phase of control, said desired amount of regenerative braking decreases as the amount of braking applied by said second set of friction brakes increases.

9. A method of controlling the braking of a vehicle that has a first set of friction brakes for applying a first apply brake force to a first set of wheels, a second set of friction brakes for applying a second brake apply force to a second set of wheels, and a powertrain assembly coupled to said second set of wheels, said powertrain assembly including a regenerative braking unit capable of recapturing kinetic energy from said second set of wheels, said method comprising the steps of:
braking said vehicle in a first phase of control using regenerative braking to brake said second set of wheels to achieve up to a first value of braking;
braking said vehicle in a second phase of control using said regenerative braking to maintain braking of said second set of wheels at said first value of braking force while selectively applying said first friction brakes to said first set of wheels up to a second value of braking; and
braking said vehicle in a third phase of control by selectively using said first set of friction brakes to brake said first set of wheels and using said second set of friction brakes to brake said second set of wheels together with a desired amount of regenerative braking when above said second value of braking, when braking said vehicle in said third phase of control, said desired amount of regenerative braking is decreased preceding the application of said second set of friction brakes, said decrease in the amount of regenerative braking being a function of said amount of kinetic energy recaptured by an energy storage device of the regenerative braking unit becoming capacitized.

10. The method of claim 9 wherein no friction brakes are applied during said first phase of control.

11. The method of claim 9 wherein said first value of braking is a maximum output of said regenerative braking torque.

12. The method of claim 9 wherein braking from only said first set of friction brakes and said second set of friction brakes are applied if a vehicle speed is less than a predetermined threshold.

13. A method of determining brake control between a non-driven axle and a driven axle in a braking system where said braking system includes an electric motor for applying a regenerative braking force to said driven axle, and where said braking system further includes a first set of friction brakes for applying a first brake apply force to a first set of wheels coupled to said non-driven axle and a second set of friction brakes for applying a second brake apply force to a second set of wheels coupled to said driven axle, said method comprising the steps of:
receiving a pressure input command relating to a total braking force for braking a vehicle;
determining an actual regenerative braking force and comparing said actual regenerative braking force to said total braking force demand;
selecting a brake application strategy as one of the group of:
if said actual regenerative braking force is greater than said total braking force demand, using said actual regenerative braking force to brake said driven axle up to said total braking force demand; and
if said actual regenerative braking force is less than said total braking force demand, determining said first brake apply force to be applied to said first set of friction brakes of said non-driven axle and said second brake apply force to be applied to said second set of friction brakes of said driven axle, said sum of said first brake apply force and said second brake apply force being equal to said total braking force demand with a braking relationship between said first brake apply force applied to said non-driven axle and said actual regenerative braking force and second brake apply force applied to said driven axle that includes a linear portion, then
comparing said second braking brake apply force to said actual regenerative braking force and selecting a brake application strategy from the subgroup of:
if said actual regenerative braking force is less than said second brake apply force, then determining a brake apply difference between said second brake apply force and said actual regenerative braking force, and then applying said first brake apply force to said first set of friction brakes of said non-driven axle, and applying said actual regenerative braking force and said brake apply difference to said second set of friction brakes of said driven axle; and
if said actual regenerative braking force is greater than said second brake apply force, then applying said actual regenerative braking force to said driven axle up to said second brake apply force and applying said first brake apply force to said first set of friction brakes of said non-driven axle.

14. The method of claim 13 wherein said actual regenerative braking force applied to said driven axle is applied up to a first value of braking force.

15. The method of claim 14 wherein said actual regenerative braking force applied to said driven axle and said first brake apply force applied to said first set of friction brakes of said non-driven axle are cooperatively applied up to a second value of braking force.

16. The method of claim 15 wherein said actual regenerative braking force applied to said driven axle, said first brake apply force applied to said first set of friction brakes of said non-driven axle, and said brake force difference applied to said second set of friction brakes of said driven axle are cooperatively applied above said second value of braking force.

17. The method of claim 16 wherein said actual regenerative braking force decreases when above said second value of braking.

18. The method of claim 13 wherein braking from only said first set of friction brakes and said second set of friction brakes is applied if a vehicle speed is less than a predetermined threshold.

19. A method of controlling a vehicular regenerative braking system that includes a first set of friction brakes for applying a first brake apply force to a first set of wheels coupled to said non-driven axle, a second set of friction brakes for applying a second brake apply force to a second set of wheels coupled to a driven axle, a powertrain assembly coupled to said second set of wheels, said powertrain assembly including a regenerative braking unit for applying a regenerative braking force to said driven axle, said method comprising the steps of:

determining a desired brake balance line representative of a ratio of braking forces between a first set of brakes of a non-driven axle and a second set of brakes of a driven axle, said desired brake balance ratio having a first, a second, and a third control phase;

applying said regenerative braking force to said driven axle in said first control phase up to a first value of brake force;

cooperatively applying said first brake apply force and said regenerative braking force in said second control phase up to a second value where said second value is in a region of front bias braking balance control with said first brake apply force applied in said second phase of control exceeding said front bias braking balance control of said desired brake balance line; and cooperatively applying said second brake apply force together with said first brake apply force and said regenerative braking force in a third phase of control up to a third value of braking.

20. A method of controlling a vehicular regenerative braking system that includes a first set of friction brakes for applying a first brake apply force to a first set of wheels coupled to said non-driven axle, a second set of friction brakes for applying a second brake apply force to a second set of wheels coupled to a driven axle, a powertrain assembly coupled to said second set of wheels, said powertrain assembly including a regenerative braking unit for applying a regenerative braking force to said driven axle, said method comprising the steps of:

determining a desired brake balance line representative of a ratio of braking forces between a first set of brakes of a non-driven axle and a second set of brakes of a driven axle, said desired brake balance ratio having a first, a second, and a third control phase;

applying said regenerative braking force to said driven axle in said first control phase up to a first value of brake force;

cooperatively applying only said first brake apply force and said regenerative braking force in said second control phase up to a second value wherein said second value is in a region of front bias braking balance control; and cooperatively applying said second brake apply force together with said first brake apply force and said regenerative braking force in said third phase of control up to a third value of braking with at least one of said first and said second and third phases of control including a linear relationship between the braking forces applied to the first and second sets of wheels, with said third value of braking disposed in said region of said front bias braking balance control and with said first and second brake apply force applied in said third phase of control exceeding said front bias braking balance control of said desired brake balance line ratio.

21. The method of claim 20 wherein said third value of braking is disposed on said desired brake balance line.

22. The method of claim 20 wherein said second value of braking is disposed on said desired brake balance line.

23. The method of claim 20 wherein said regenerative braking force is not applied if a vehicle speed is less than a predetermined threshold.

24. A method of controlling the braking of a vehicle that has a first set of friction brakes for applying a first apply brake force to a first set of wheels, a second set of friction brakes for applying a second brake apply force to a second set of wheels, and a powertrain assembly coupled to said second set of wheels, said powertrain assembly including a regenerative braking unit capable of recapturing kinetic energy from said second set of wheels, said method comprising the steps of:

braking said vehicle in a first phase of control using regenerative braking to brake only said second set of wheels to achieve up to a first value of braking;

braking said vehicle in a second phase of control using only said regenerative braking and said first set of friction brakes, wherein said regenerative braking maintains braking of said second set of wheels at said first value of braking force while said first set of friction brakes is selectively applied to said first set of wheels up to a second value of braking with second phase of control including a linear relationship between the braking forces applied to the first and second sets of wheels; and braking said vehicle in a third phase of control by selectively using said first set of friction brakes to brake said first set of wheels and using said second set of friction brakes to brake said second set of wheels together with a desired amount of regenerative braking when above said second value of braking with said application of said first set of friction brakes and said second set of friction brakes exceeding a front bias braking control of a desired brake balance ratio during said third phase of control.

* * * * *